United States Patent [19]
Kassner

[11] Patent Number: 5,678,507
[45] Date of Patent: Oct. 21, 1997

[54] SQUIRREL PROOF BIRD FEEDER

[75] Inventor: William H. Kassner, 3830 Tuckahoe Rd., Williamstown, N.J. 08094

[73] Assignee: William H. Kassner, Williamstown, N.J.

[21] Appl. No.: 676,933

[22] Filed: Jul. 8, 1996

[51] Int. Cl.⁶ ............................................. A01K 39/01
[52] U.S. Cl. ............................................. 119/57.9
[58] Field of Search ..................... 119/57.9, 52.2, 119/52.3, 57.8, 468

[56] References Cited

U.S. PATENT DOCUMENTS

| | | | |
|---|---|---|---|
| 4,327,669 | 5/1982 | Blasbalg | 119/57.8 |
| 4,841,910 | 6/1989 | Kilham | 119/468 |
| 4,977,859 | 12/1990 | Kilham | 119/52.2 |
| 5,215,039 | 6/1993 | Bescherer | 119/57.8 |

*Primary Examiner*—Robert P. Swiatek
*Assistant Examiner*—Yvonne R. Abbott

[57] ABSTRACT

A bird feeder of cylindrical shape is hung by a loop on the top of a wire which runs through the center of the full length of the feeder. A beveled upper edge on the bottom closure, and spring perches, and no other protruding parts along the full length of the feeder prevent squirrels from securing a position on the feeder. There are no moving parts, and all parts are highly weather resistant.

7 Claims, 1 Drawing Sheet

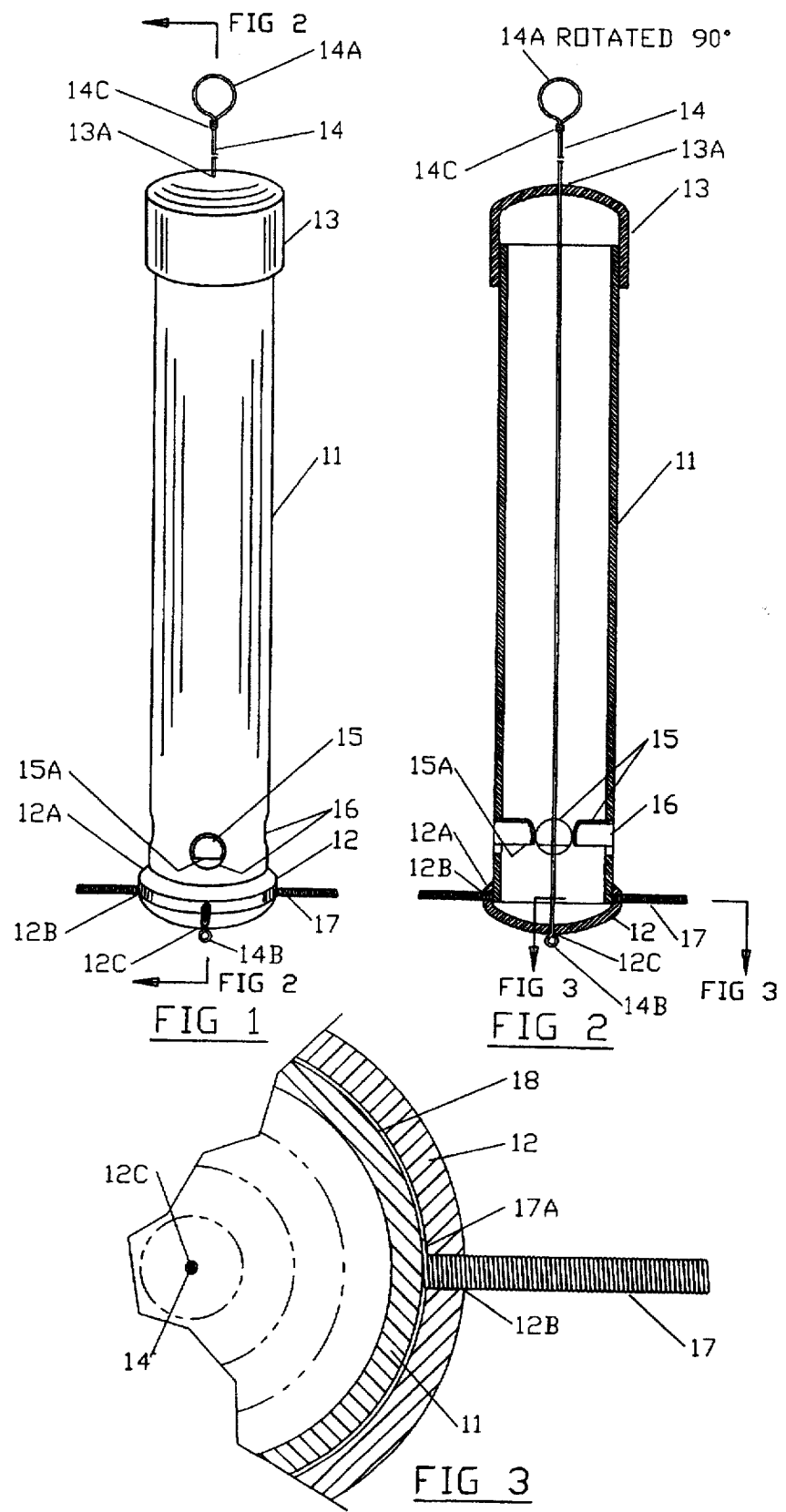

SQUIRREL PROOF BIRD FEEDER

BACKGROUND OF THE INVENTION

This invention is a bird feeder, more specifically, an apparatus to prevent a squirrel from getting on and damaging the bird feeder.

Most bird feeders are susceptible to damage by squirrels. Some bird feeders address this problem but none offer a satisfactory solution.

In U.S. Pat. No. 5,105,765 to LOKEN, a weighted lever prevents a heavier bird from feeding by swinging down from the feeding position. In U.S. Pat. No. 5,195,460 to LOKEN, a multiple feeder station is disclosed. In U.S. Pat. No. 5,207,181 to LOKEN, a shield is added to the perch to visually block the feeding space when the perch swings down. In U.S. Pat. No. 4,846,111 to KILHAM, a coiled wire with a keeper is used to regulate the weight of a bird that may perch on the feeder. In U.S. Pat. No. 4,646,686 to FURLANI, an outer sleeve mounted on a spring slides down to close the feeding space when a heavier bird perches. In U.S. Pat. No. 5,048,461 to WESSNER, a counter-balanced lever closes a door to the feeding area when a heavier bird perches.

These devices do not offer the most economical or pragmatic solution to the problem.

SUMMARY OF INVENTION

The present invention offers a practical way to feed birds, without damaging interference by squirrels. It is economically constructed of premanufactured parts, with minor alterations.

It is an object of the present invention to provide a bird feeder with a minimum of protruding parts and ledges, which could provide a foothold for a squirrel.

It is an object of the present invention to be of a length sufficient to prevent a squirrel from reaching the feed, by hanging from the top of the feeder.

It is an object of the present invention to be as simple as possible, with no moving parts.

It is an object of the present invention to provide a perch that will bend down under the weight of a squirrel, offering no support, then spring back up, after the squirrel has dropped off.

It is an object of the present invention to be weather-proof.

It is an object of the present invention to be easily disassembled for cleaning.

BRIEF DESCRIPTION OF THE DRAWINGS

FIG. 1 is a perspective view of an apparatus of the present invention.

FIG. 2 is a cross-sectional view taken along lines 2—2 of FIG. 1.

FIG. 3 is a cross-sectional view taken along lines 3—3 of FIG. 2.

DETAILED DESCRIPTION OF THE INVENTION

In FIGS. 1, 2 and 3, numeral (11) is a 20" length of 3" PVC pipe with four holes (16), of a diameter of 1 1/16", drilled through the wall at 90 degree intervals along the circumference, centered 2 1/4" from the bottom.

In FIGS., 1, 2 and 3, numeral (12) is a 3" PVC cap with a 45 degree bevel (12a) cut through the circumference, starting 1/2", along the side, from the closed end, and extending inward toward the open end of the cap. Four 1/4" diameter holes (12b) are drilled, at 90 degree intervals, through the side of cap (12), centered 1/4" below the outside of bevel (12a). A 3/32" hole (12c) is drilled through the center of the closed end of cap (12).

In FIGS. 1 and 2, numeral (13) is a 3" PVC cap with a 3/32" diameter hole (13a) drilled through the center of the closed end.

In FIGS. 1,2 and 3, numeral (14) is a 14 gauge galvanized steel wire, threaded through cap (12), pipe (11), and cap (13), with 1/4" of one end bent back on itself (14b), and the other end bent in a 1" diameter loop (14a), and twisted closed (14c), 3" above cap (13).

As seen in FIG. 1, cap (12) and cap (13) are both placed loosely on pipe (11). While hanging by loop (14a), the 1/4" bend (14b), in wire (14), supports cap (12), which in turn supports pipe (11) and cap (13).

FIGS. 1 and 2, show the four seed baffles (15) which are each, a 1/2" PVC pipe caps with the bottom third (15a) removed by making a cut perpendicular to the diameters at a point one third across the diameter. The seed baffle is then glued, with PVC cement, to opening (16) with the cut opening facing downward, and the extreme edge of the round opening flush with the outside edge of pipe (11). The baffles (15) prevent the seeds in chamber (19) from escaping through openings (16).

In FIGS. 1, 2 and 3, the four perches (17) are made by cutting two 1/4" by 4" springs [#186X CROWN BOLT INC.] each, into two pieces of equal length. The tang (17a) is formed by bending half of the last coils on the cut end of perch (17), to a position tangent to the circumference of the spring. The uncut end of perch (17) is threaded through hole (12b), in cap (12), from the inside, until tang (17a) rests against the inside of cap (12). The cap (12) is slid over the bottom of pipe (11), locking tang (17a), into space (18), to prevent perch (17) from being pulled out of cap (12). The space (18) is exaggerated in FIG. 3, to show the detail of the locking mechanism.

I claim:

1. A bird feeder allowing small birds to feed from the feeder while preventing squirrels from feeding from or causing damage to the feeder, wherein the feeder comprises:

(a) a cylindrical seed container, supported in a vertical position, of consistent diameter and a length from top to bottom with a side wall having holes near the bottom of a sufficient diameter to allow a bird to extract seeds, and (b) a cylindrical closure of consistent diameter with a length from top to bottom and having an end wall across the top with a hole through the center, to be placed on top of said feeder to keep weather out, and (c) a cylindrical closure of consistent diameter with a length from top to bottom and having an end wall across the bottom with a hole through the center and holes in a side wall and the side wall beveled on the open end, to be placed on the bottom of said feeder to prevent seeds from escaping, and (d) baffles of a cylindrical shape with a consistent diameter and a length from end to end and a wall across one end and having a section removed, to be placed in said holes of said container to prevent seeds from escaping, and (e) a hanging apparatus having a consistent diameter and a length from top to bottom and a loop of uniform diameter at the top and a supporting contrivance at the bottom, and (f) perches, each consisting of a spring of consistent diameter and a length from end to end with a locking mechanism on one end.

2. The baffles of claim 1 wherein each said baffle is a polyvinylchloride cap with a portion removed.

3. The hanging apparatus of claim 1 wherein said apparatus is threaded through said container and both said closures.

4. The hanging apparatus of claim 1 wherein the bottom end of said apparatus is bent back on itself to support said feeder.

5. The perch of claim 1 wherein said perch is made of a premanufactured spring.

6. The perch locking mechanism of claim 1 wherein the said locking mechanism is a result of bending the last coil of said perch.

7. The bottom closure in claim 1 wherein the open end of the side wall of said closure is beveled.

* * * * *